United States Patent [19]

Jarvinen

[11] 4,446,512

[45] May 1, 1984

[54] CIRCUITRY FOR SINE WAVE RECONSTRUCTION

[75] Inventor: Willard B. Jarvinen, Roanoke, Va.

[73] Assignee: General Electric Company, Salem, Va.

[21] Appl. No.: 340,400

[22] Filed: Jan. 18, 1982

[51] Int. Cl.³ .......................................... H02M 5/00
[52] U.S. Cl. .................................. 363/39; 328/167; 307/260; 307/520
[58] Field of Search .......................... 363/44–48, 363/39, 125, 128–129; 323/910, 212–213, 217; 318/798–800, 805, 812; 307/260, 520–524; 328/165–167; 330/107, 109

[56] References Cited

U.S. PATENT DOCUMENTS

| | | | |
|---|---|---|---|
| 2,879,486 | 3/1959 | Grandmont et al. | 307/105 X |
| 3,628,057 | 12/1971 | Mueller | 307/105 |
| 3,678,369 | 7/1972 | Splatt | 363/39 X |
| 3,976,868 | 8/1976 | Lane | 235/184 |
| 3,978,420 | 8/1976 | Lane | 330/107 |
| 3,986,127 | 10/1976 | Ray | 328/167 X |
| 4,399,395 | 8/1983 | Espelage | 318/803 |

Primary Examiner—Peter S. Wong
Attorney, Agent, or Firm—Arnold E. Renner

[57] ABSTRACT

A scheme for providing an output signal approximating a true sine wave representative of a sine wave source voltage from corrupted line voltages connecting the source to a load includes the development of a first signal representative of the corrupted lines line voltage. The first signal is then filtered to reject all but higher frequency components and this filtered output is then combined with the first signal to provide a combined signal which is further filtered to provide a final output signal.

4 Claims, 2 Drawing Figures

CIRCUITRY FOR SINE WAVE RECONSTRUCTION

BACKGROUND OF THE INVENTION

The present invention relates generally to sine wave reconstruction techniques and more particularly to a method and circuitry for providing an output signal, representative of a sine wave source voltage, from corrupted voltages which appear on the lines connecting the source to a load.

There are a number of instances in which it is desirable to have an accurate representation of a sine wave source voltage. One of the more common of these is in the power conversion/motor control art where semiconductor (e.g., thyristor) converter bridges are used to power and control an electric motor. In these applications it is necessary to have an accurate representation of the source voltage in order to properly synchronize the rendering of the bridge semiconductors conductive with respect to the source voltage. This is normally done by detecting when the voltage crosses the zero axis.

If no disturbances occur on the lines, such detection poses no problems. Such, however, is seldom the case. This is particularly true where semiconductor power bridges are used and the transfer of current from one bridge thyristor to another causes periodic short circuits across the power lines which in turn causes rather severe disturbances on those lines. These disturbances become even more pronounced when plural converters are connected to the lines with the attendant increase in the number of disturbances. A number of systems are known and have been employed to reconstruct the sine wave representation of the source voltage. In U.S. Pat. No. 3,976,868 "Voltage Synthesization" by L. J. Lane, issued Aug. 24, 1976, signals proportional to the instantaneous values of the voltage at the terminals of the voltage supply and to the rate of change, with respect to the time, of the current supplied to a load are developed and utilized to synthesize the voltage. An elaboration of this scheme involves providing the output of the 3,976,868 patent to an overdriven amplifier, the output of which is then furnished to a self-tuning filter such as that described in U.S. Pat. No. 3,978,420 "Self-Tuning Filter" by L. J. Lane, issued Aug. 31, 1976. As a further example, reference is made to U.S. Pat. No. 4,399,395 "Line-to-Line Voltage Reconstruction for Synchronizing Thyristor Power Converter" P. M. Espelage, issued Aug. 16, 1983. In this latter patent the system described basically provides that the integral of the line-to-line voltage is summed with the product of a load current and the commutation inductance to provide a reconstructed source voltage representation.

These known methods are very satisfactory and properly employed furnish excellent results. They are, however, fairly complex and hence expensive and in those applications requiring a high degree of precision can be fully justified. There are, however, a number of situations in which this high degree of accuracy is not necessary and in which it is difficult to justify the expense of these systems.

SUMMARY OF THE INVENTION

It is, therefore, an object of the present invention to provide a method and circuitry for reconstructing a representation of a sine wave voltage from corrupted line voltages.

It is a further object to provide a sine wave reconstruction technique which requires the sensing of only line-to-line voltages.

It is a still further object to provide a sine wave reconstruction technique which is relatively simple and inexpensive and yet sufficiently accurate for many applications.

It is an additional object to provide a sine wave reconstruction technique which can be implemented in a relatively simple manner using relatively inexpensive components.

The foregoing and other objects are achieved in accordance with the present invention by first developing a signal which is representative of the line-to-line voltage between two phases of the line voltages. In response to the thusly developed signal, there is developed a second signal which is representative of only the higher frequency components of the first signal. These two signals are then combined and this combined signal is filtered to provide an output signal which is representative of the sine wave source voltage.

BRIEF DESCRIPTION OF THE DRAWING

While the present invention is described in particularity in the claims annexed to and forming a part of this specification, a better understanding of the invention can be had by reference to the following description taken into conjunction with the accompanying drawing in which:

DETAILED DESCRIPTION

Figure 1:
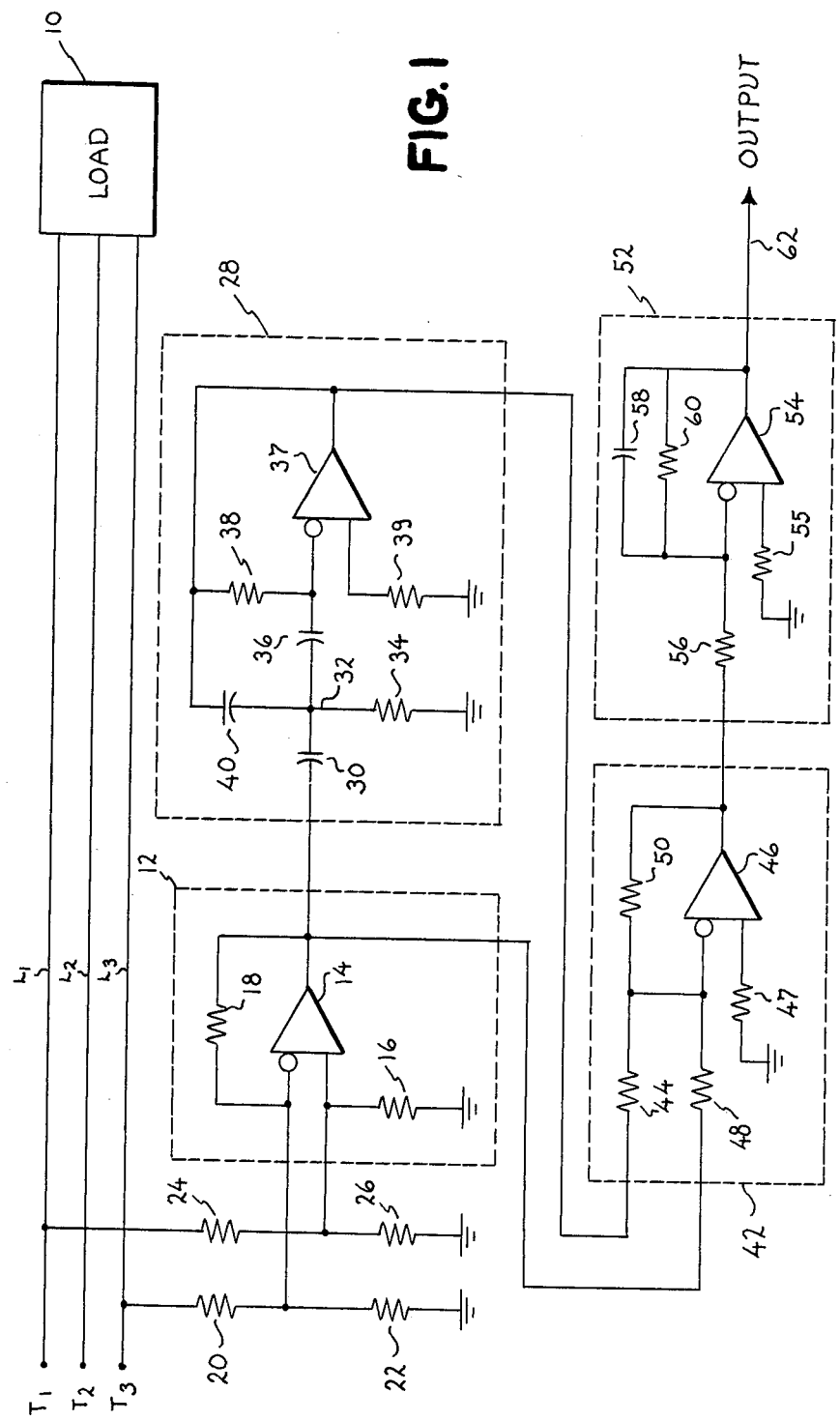
FIG. 1 is a schematic drawing illustrating the circuitry of the present invention in its preferred embodiment; and, FIG. 2 illustrates wave shapes helpful in understanding the present invention.

Referring now to FIG. 1, which shows the circuitry of the present invention in its preferred embodiment, it is seen that a source voltage represented by terminals $T_1$, $T_2$ and $T_3$ is connected to a load 10 by way of lines $L_1$, $L_2$ and $L_3$. The nature of load 10 is not important to the present invention but it would, typically, comprise one or more power converters each supplying one or more electric motors. In accordance with the depiction of FIG. 1, the voltages on lines $L_1$ and $L_3$ (which designation will also be used for the voltage) serve as inputs to a differential amplifier 12 which includes an operational amplifier 14 having its non-inverting input connected to ground by way of a suitable resistor 16 and a feedback resistor 18 connected between its output and its inverting input. In order to properly scale the voltage levels, the phase voltage $L_3$ is furnished to the inverting input of the operational amplifier 14 by way of a voltage divider comprised of series connected resistors 20 and 22. Similarly, the phase voltage $L_1$ is applied as the non-inverting input to operational amplifier 14 by way of the voltage divider comprised of resistors 24 and 26. Reference is now made to the upper trace of FIG. 2 which shows the line to neutral voltages as they might appear on lines $L_1$, $L_2$ and $L_3$, including disturbances caused by a single converter supplying a motor load. The illustrated distortions shown of the since wave are what are commonly known as commutation notches. The wave shapes shown in this trace are those which occur when the firing angle of the thyristors plus one-half of the commutation angle equals 90°.

Figure 2:
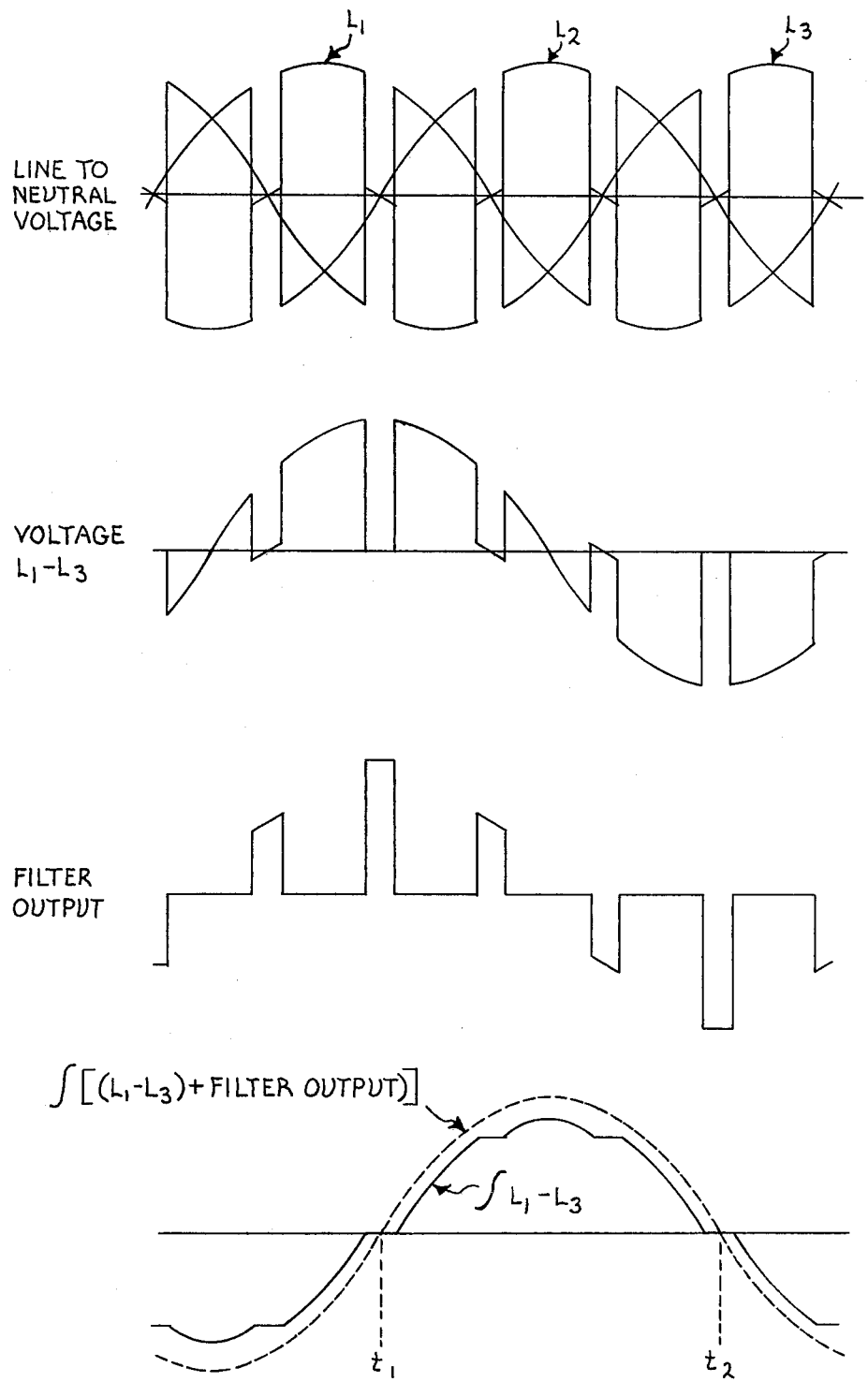

The second trace of FIG. 2 illustrates the output of the differential amplifier circuit 12 and it is seen that it is essentially 30 electrical degrees lagging with respect to the $L_1$ to neutral voltage and that the commutation notches are essentially in time alignment of that phase to neutral voltage.

Referring again to FIG. 1, the output of the differential amplifier 12 serves as the input to a high pass filter network 28. The high pass filter 28 consists of a pair of series connected input capacitors 30 and 36 through which the signal from the amplifier 12 is applied to the inverting input of an operational amplifier 37. The juncture of capacitors 30 and 36 (point 32) is connected to ground by way of a resistor 34 and this same point is also connected by way of capacitor 40 to the output of the operational amplifier 37. A feedback resistor 38 is connected between the inverting input and the output of operational amplifier 37 and the non-inverting input of amplifier 37 is connected to ground by way of a resistor 38. The high pass filter within block 28 is essentially that which is shown and described in greater detail in the publication "Handbook of Operational Amplifier Active RC Networks" by Burr-Brown, Copyright 1966 [Reference circuit number five (5) on page 76.] The frequencies to be passed by the high pass filter network 28 are somewhat arbitrary but it is believed that satisfactory results can be obtained when the filter network 28 is designed to pass frequencies greater than approximately two and one-half times the fundamental frequency of the source voltage. Assuming this voltage were 60 hertz, the high pass filter 28 would, therefore, be designed and its component values appropriate to passing frequencies greater than 150 hertz.

Referencing once again FIG. 2, the output of filter 28 is shown by the third trace from the top and it is seen that the filter output is a series of spikes or narrow pulses which are in time synchronization with the disturbances of the $L_1$-$L_3$ voltage, equal the magnitude and inverted with respect thereto.

The outputs of the differential amplifier 12 and the filter 28 are summed within a suitable summing circuit represented within dashed line block 42. As shown, the summing circuit includes an operational amplifier 46 having its non-inverting input connected to ground by way of a resistor 47 and the two signals from the circuits 12 and 28 are connected by respective resistors 48 and 44 to the inverting input. A feedback resistor 50 is connected between the output and the inverting input of the operational amplifier 46. The output of the summing circuit 42 is supplied to a filter circuit 52 which provides as its output on line 62, a signal which is a representation of the sine wave source voltage. In the presently illustrated embodiment of the invention, the filter network 52 takes on the basic form of an integrating network which provides a fixed amount of the phase shift with respect to its input. To this end the filter 52 includes an operational amplifier 54 having its non-inverting input connected to ground via resistor 55. The inverting input of the operational amplifier receives the output of circuit 42 by way of an input resistor 56. A parallel connection of a capacitor 58 and a resistor 60 is connected between the output and inverting input of the amplifier 54. Those familiar with operational amplifier integrators will recognize that the existence of the resistor 60 precludes this circuit from being a pure integrator and that, therefore, the phase displacement will not be exactly 90°. The need or desirability for the resistor 60 is apparent when it is recognized that a certain amount of dc components will be present in the signal applied to the integrator and were it not for the resistor 60 the integrating circuit (filter) would have a tendency to go to saturation and thus preclude the efficient use of the present invention.

The bottom trace of FIG. 2 illustrates the improvement of the present invention over a simple integration of the line voltages. As shown by the solid line in FIG. 2, the integral of the $L_1$ to $L_3$ voltage, it is seen that, for example, at times $t_1$ and $t_2$ there is a substantial flat spot within the wave shape. When this is compared to the upper trace FIG. 1, it is seen that, in this instance, these flat spots correspond, in time, to the zero crossings of the $L_2$ voltage. Thus, these flat spots would render a pure integration of the line voltages unsuitable since there are periods of time in which the zero crossing is not well defined. By supplying, in accordance with the present invention, the combination of the voltage $L_1$-$L_3$ with the inverted high frequency components of that voltage, the dashed line depiction of FIG. 2 is achieved and it is seen that this more closely approximates a sine wave and does not exhibit the flat spot characteristics of the solid line depiction.

Thus, by the design of the integrator filter circuit 52, the phase displacement of the output signal with respect to the line voltages is known and by the use of any of the appropriate known zero crossing detectors, the present invention may be utilized to provide synchronization with respect to the line voltages regardless of the number or type of disturbances on the lines.

While there has been shown and described what is at present considered to be the preferred embodiment of the present invention, modifications thereto will readily occur to those skilled in the art. It is not desired, therefore, that the invention be limited to this specific circuit and scheme shown and described and it is intended to cover in the appended claims all such modifications as fall within the true spirit and scope of the invention.

What is claimed is:

1. Circuitry for producing a sine wave output signal representative of a polyphase sine wave source voltage from signals representing line voltages taken from lines connecting the source to a load comprising:
   (a) differential amplifier means to provide a first signal representing an actual voltage existing between two phases of the line voltages;
   (b) means including an operational amplifier responsive to said first signal to provide a second signal representing only higher frequency components of said first signal;
   (c) operational amplifier means to combine said first and second signals to develop a combined signal; and,
   (d) means to filter said combined signal to provide said sine wave output signal.

2. The invention in accordance with claim 1 wherein said means to provide said second signal comprises a high pass filter.

3. The invention in accordance with claim 2 wherein said polyphase sine wave source voltage has a fundamental frequency and wherein said high pass filter rejects frequencies less than approximately two and one-half times the fundamental frequency of said source voltage.

4. The invention in accordance with claim 1 wherein said means to filter includes means to integrate said combined signal.

* * * * *